June 12, 1923.
J. F. LEMONS
1,458,424
APPARATUS FOR DISTRIBUTING POWDER
Filed Oct. 14, 1922
2 Sheets-Sheet 1
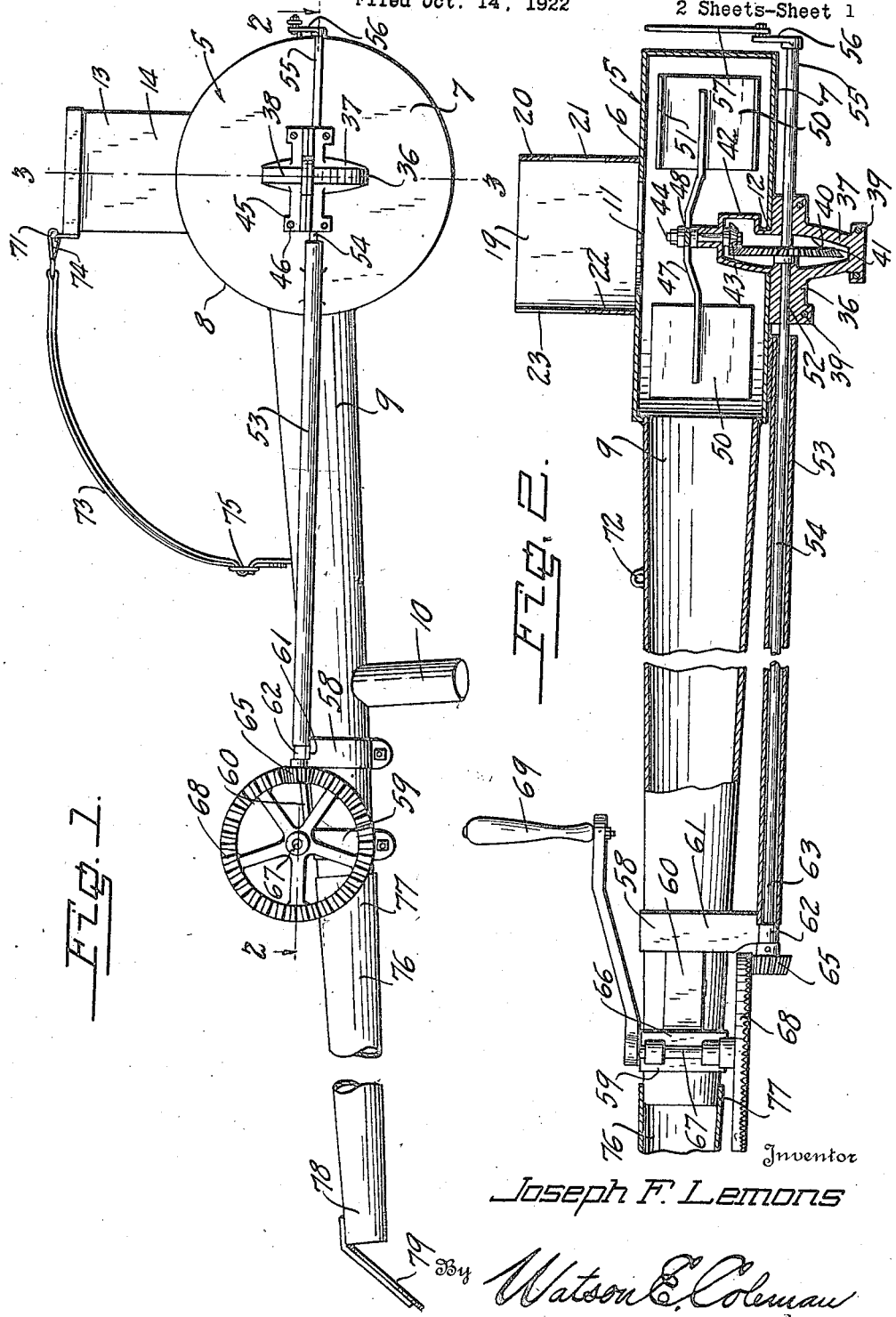
Inventor
Joseph F. Lemons
By Watson E. Coleman
Attorney

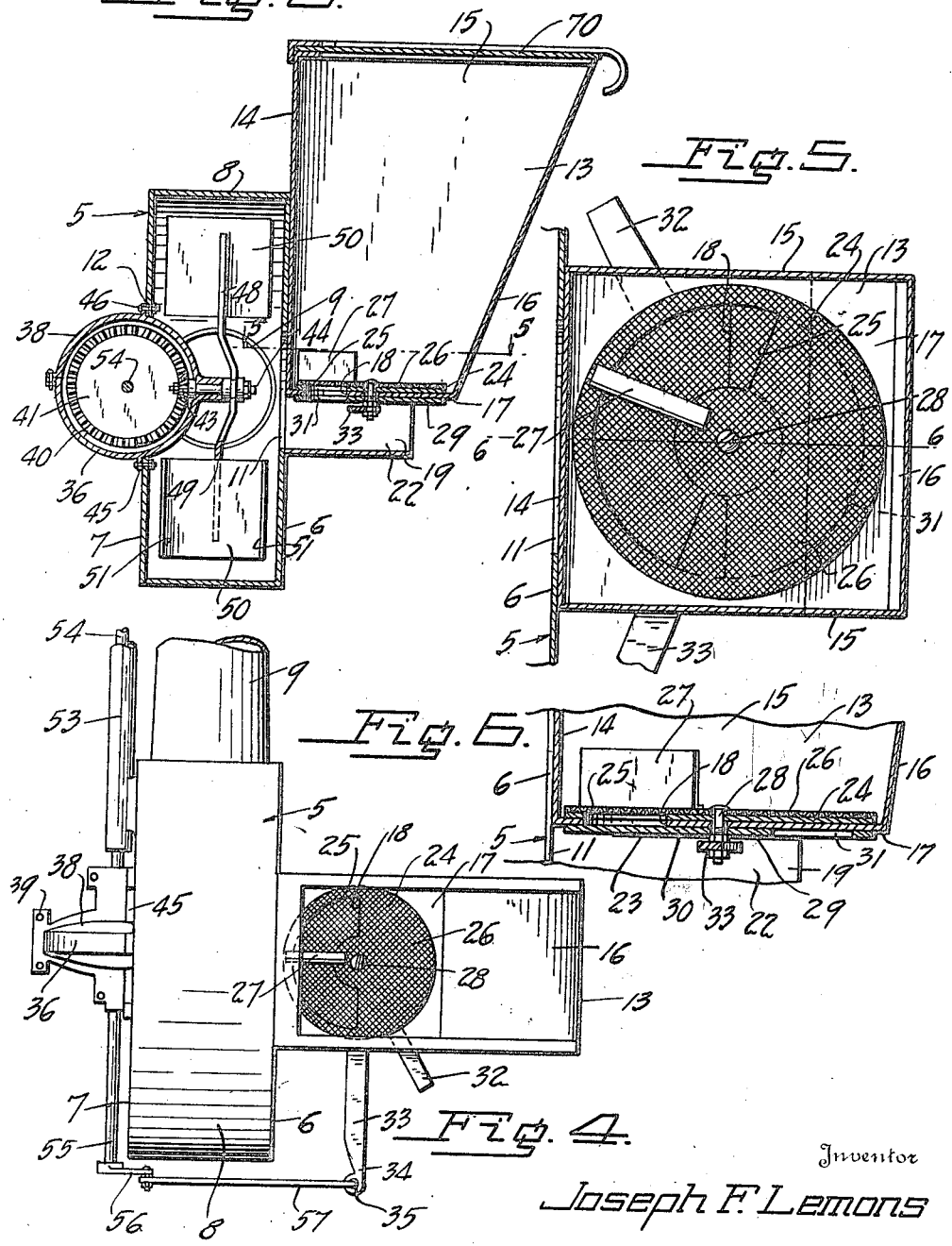

Patented June 12, 1923.

1,458,424

UNITED STATES PATENT OFFICE.

JOSEPH F. LEMONS, OF ADAMS, TENNESSEE, ASSIGNOR OF ONE-HALF TO COLEMAN R. LEMONS, OF ADAMS, TENNESSEE.

APPARATUS FOR DISTRIBUTING POWDER.

Application filed October 14, 1922. Serial No. 594,484.

*To all whom it may concern:*

Be it known that I, JOSEPH F. LEMONS, a citizen of the United States, residing at Adams, in the county of Robertson and State of Tennessee, have invented certain new and useful Improvements in Apparatus for Distributing Powder, of which the following is a specification, reference being had to the accompanying drawings.

This invention relates to apparatus for use in the discharge of powder, in a cloud, upon all forms of vegetation to destroy the destructive agencies of the vegetation.

It is an object of the invention to provide a device of this character capable of being conveniently carried by the operator for discharging the powder in a dust like cloud upon the plant in a manner to reach all portions of the plant.

It is another object of the invention to provide a device of this character including an outlet member arranged to support the operating means of the device within convenient reach of the operator.

It is a further object of the invention to provide a device of this character including a hopper in which agitating means are mounted, the agitating means being operable by the operating means of the device.

With these and other objects in view, the invention consists in the improved construction and arrangement of parts to be hereinafter more particularly described, fully claimed and illustrated in the accompanying drawings, in which:—

Figure 1 is a side elevation of an apparatus for distributing powder constructed in accordance with an embodiment of the invention;

Figure 2 is a sectional view taken on the line 2—2 of Figure 1;

Figure 3 is a sectional view taken on the line 3—3 of Figure 1;

Figure 4 is a fragmentary top plan view;

Figure 5 is a section taken on the line 5—5 of Figure 3; and

Figure 6 is a section taken on the line 6—6 of Figure 5.

Referring to the drawings, 5 designates a casing substantially in the form of a drum including side members 6 and 7 and a peripheral member 8. Projecting from the peripheral member 8 is an outlet member 9, said member consisting of a longitudinally tapered conduit, the conduit having a handle member 10 projecting from its outer end portion at right angles to the conduit. The side member 6 of the casing is provided with a centrally disposed inlet opening 11, while the side member 7 is provided with a centrally disposed slot 12.

A hopper 13 is provided, said hopper including a front wall 14, side walls 15 and upwardly inclined rear wall 16. The front wall 14 of the hopper is secured to the upper portion of the side member 6 of the drum so that the bottom 17 of the hopper terminates adjacent the inlet opening 11. The bottom 17 of the hopper has a substantially semi-circular outlet opening 18.

Disposed beneath the hopper and secured to the hopper and the side 6 of the drum is a chute 19, the side 20 of the chute having a slot 21 disposed centrally of the upper edge of said side, while the side 22 of the chute is provided with a slot 23 which extends through the rear end of said side. The rear end portion of the chute is open to admit air.

Disposed centrally of the bottom 17 of the hopper and interiorly of the hopper is an agitating disc 24, said disc having a semi-circular opening 25. A sheet of screen fabric 26 is secured to the upper face of the disc 24, said screen extending over the opening 25. Extending transversely of the central portion of the opening 25 is a blade 27 adapted to engage the material within the hopper so as to agitate the same and cause movement of the material through the opening 25 and the opening 18 in the bottom of the hopper.

The disc 24 is rotatably mounted within the hopper, the shaft 28 of the disc extending through the bottom of the hopper and is intended to support a valve member 29. This valve member consists of a disc 30 having a semi-circular opening 31 adapted at times to register with the opening 18 in the bottom of the hopper. The disc 30 is also provided with an operating handle 32 by means of which the size of the opening in the bottom of the hopper may be increased or decreased. The handle 32 is intended to extend into the slot 23 of the side 22 of the chute so as to permit the operator to readily manipulate the valve from the side of the hopper.

Extending through the slot 21 of the side 20 of the chute is a lever 33, said lever being secured to the shaft 28 below the valve 30.

The end portion 34 of the lever 33 is provided with an opening 35 for a purpose to be hereinafter described, that portion of the end portion 34 adjacent the opening being cut away so as to prevent contact of the lever 33 with the adjacent portion of the drum. By this means the contents of the hopper is discharged into the chute and is drawn into the drum from the chute.

In order that the contents of the hopper may be drawn into the drum and discharged through the outlet member 9, there is provided a novel fan mechanism embodying a gear housing 36 divided into a pair of sections 37 and 38, each of said sections having flanges through which bolts 39 are passed for connecting the sections to each other. The gear housing includes a compartment 40 adapted to house a relatively large bevel gear 41. A smaller gear housing 42 is intended to house a bevel gear 43 from which a shaft 44 extends. The housing 36 is adapted to extend into the slot 12 of the side 7 of the drum, half of the housing being disposed inwardly of the drum and half outwardly of the drum.

The central portion of said housing or that portion disposed in engagement with the outer face of the side 7 of the housing is provided with flanges 45 for the reception of fastening means 46 for securing the housing to the drum. The end of the shaft 44 is intended to receive a fan, said fan comprising strips 47 and 48 which are offset at their central portions and provided with registering openings adapted to receive the shaft 42. These strips are disposed parallel to the sides of the drum. The end portions of each strip are provided with slits 49 adapted to receive fan blades 50. The sides of said blades are provided with upturned flanges 51 which assist the blades in distributing the contents of the drum.

The lower section 38 of the gear housing is provided with a shaft housing 52, the shaft housing being disposed adjacent the central opening of the gear 41. Carried by the sides 7 of the drum is a shaft housing 53, said housing extending outwardly in the direction of the outlet member 9. Disposed within the housing 53 is a shaft 54, said shaft extending through the shaft housing 52 of the section 38 and through the gear housing and beyond the edge of the side 7.

Connected to the end 55 of the shaft 54 is a crank member 56, on which a connecting rod 57 is mounted. The end of the rod 57 is extended at right angles to the shaft 54 and is adapted to extend into the opening 35 of the lever 33.

Carried by the outer end portion of the outlet member 9 are clamps 58 and 59, while secured to the bight portion of said clamps is a connecting member 60. Carried by the connecting member above the clamp 58 is a plate 61 which projects beyond the connecting member and the clamp and has a bearing 62 provided on its end portion adapted to receive the end portion 63 of the shaft 54. The outer end portion of the shaft housing 53 is also secured to the plate 61.

Carried by the end portion 63 of the shaft 54 is a bevel gear 65. Secured to the connecting member 60 above the clamp 59 is a bearing member 66 in which a shaft 67 is journaled. A relatively large gear 68 is secured to one end of the shaft, while an operating handle 69 is secured to the opposite end of the shaft. The hopper 13 is provided with a cover 70 which is mounted in guides formed at the upper ends of the hopper.

The side of the hopper adjacent the outlet member 9 is provided with a lug 71, while the lower central portion of the outlet member 9 is also provided with an eye 72. A strap 73 is provided for supporting the gun. This strap has snap fasteners 74 at its end portions for engagement with the eyes 71 and 72. This strap is also provided with a buckle 75 to permit adjustment of the strap to suit the operator.

In order to permit the material or powder to be discharged on the desired plant, regardless of the size of the plant, without requiring the operator to stoop, there is provided an outlet extension 76. This extension, similar to the outlet 9, is longitudinally tapered, the end portion 77 of said extension being adapted to receive the outer end of the extension 9. The opposite end 78 of the extension is provided with a spreader 79 which is inclined with respect to the end 78 of the extension so that the powder is discharged against the spreader and caused to radiate from the spreader into a cloud.

In the operation of the device the hopper is filled with any desired insecticide or powder and the device supported from the shoulder of the operator by means of the strap 73. The operator then rotates the gear 68 through the medium of the handle 69, thus rotating the shaft 54 and causing rotation of the fan through the medium of the gears 40 and 43. By this means the air is sucked through the chute into the drum and with the air a quantity of the material discharged from the bottom of the hopper. Upon each rotation of the shaft 54, the agitating disc 24 within the hopper is turned through the medium of the crank 57, so that there is no possibility of the material sticking in the hopper. To stop the discharge of the material it is only necessary to actuate the valve 30 to close the bottom of the hopper.

From the foregoing it will be readily seen that this invention provides a novel apparatus for use in the destruction of insects and like destructive agencies, and wherein the contents are discharged from the gun by considerable pressure generated by the fan without unnecessary effort on the part of the operator. The cloud formed through the medium of the spreader 79 is capable of reaching all portions of the plant. All of these features are possessed by an apparatus which is simple in construction and compact in form and which may be conveniently carried by the operator.

What is claimed is:—

1. An apparatus for distributing powder comprising a casing having an inlet opening in one side wall thereof, a hopper carried by one side of the casing, a chute disposed beneath the hopper for directing matter from the hopper through the inlet opening, an outlet conduit carried by the casing remote from the hopper, a gear housing extending through the opposite side wall of the casing and terminating centrally of the casing, a driven shaft projecting from that portion of the gear housing within the casing, a fan carried by said shaft, a driving shaft extending through that portion of the gear housing disposed exteriorly of the casing, operating means carried by the outlet conduit for rotating the driving shaft, and gear means disposed within the gear housing and operatively connecting the driving shaft to the driven shaft.

2. An apparatus for distributing powder comprising a casing, a hopper carried by one side of the casing, a chute disposed beneath the hopper for directing matter from the hopper into the casing, an outlet conduit carried by the casing remote from the hopper, a gear housing mounted in the opposite side of the casing, a driven shaft projecting from said gear housing within the casing, a fan carried by said shaft, a driving shaft extending through said gear housing exteriorly of the casing, operating means carried by the outlet conduit for rotating the driving shaft, gear means disposed within the gear housing and operatively connected to the driving shaft for rotating the driven shaft, agitating means disposed within the hopper, a lever extending from said agitating means, and means carried by the end of the driving shaft and operatively connected to said lever for oscillating the agitating means.

3. An apparatus for distributing powder comprising a casing, a hopper carried by one side of the casing, a chute disposed beneath the hopper for directing matter from the hopper into the casing, an outlet conduit carried by the casing remote from the hopper, a gear housing mounted in the opposite side of the casing, a driven shaft projecting from said gear housing within the casing, a fan carried by said shaft, a driving shaft extending through said gear housing exteriorly of the casing, operating means carried by the outlet conduit for rotating the driving shaft, gear means disposed within the gear housing and operatively connected to the driving shaft for rotating the driven shaft, agitating means disposed within the hopper, a lever extending from said agitating means, a crank member carried by one end of the driving shaft, a link connected to said crank, said link being operatively connected to the lever of the agitating means for oscillating said agitating means.

4. An apparatus for distributing powder comprising a casing, a fan rotatably mounted in the casing, an outlet conduit carried by the casing, a hopper carried by the casing, an outlet opening in the bottom of the hopper, an inlet opening in the side of the casing adjacent the bottom of the hopper, a chute disposed beneath the hopper, the end of said chute being open to admit air into the casing, an agitating disc mounted on the bottom of the hopper, a lever secured to the shaft of the agitating disc and extending through the chute, a valve carried by the shaft of the agitating disc beneath the bottom of the hopper, a driving shaft mounted on the casing, and means operatively connecting the driving shaft with the lever of the agitating disc.

In testimony whereof I hereunto affix my signature.

JOSEPH F. LEMONS.